United States Patent Office 2,891,991
Patented June 23, 1959

2,891,991

PROCESS FOR PREPARING HIGHER ALKYL ESTERS OF METHACRYLIC ACID

William T. Stewart and Alfred Goldschmidt, El Cerrito, Calif., assignors to California Research Corporation, San Francisco, Calif., a corporation of Delaware No Drawing. Application September 28, 1956
Serial No. 612,873

3 Claims. (Cl. 260—486)

The present invention is concerned with a novel process for preparing polymerizable unsaturated esters. More particularly, the invention is directed to a superior new process for preparing higher aliphatic esters of $\alpha,\beta$-unsaturated monocarboxylic acids which are polymerizable.

Polymerizable higher aliphatic esters of $\alpha,\beta$-unsaturated monocarboxylic acids are useful in the preparation of oil-soluble polymeric additives for lubricants and fuels. These polymerizable esters may be produced by the direct esterification of an $\alpha,\beta$-unsaturated monocarboxylic acid. However, a preferred method for preparing such esters has been by the so-called "ester interchange" reaction, or alcoholysis, of a lower alkyl ester of $\alpha,\beta$-unsaturated monocarboxylic acid with a higher aliphatic alcohol or ether alcohol. Reactions of this type customarily employ an acidic esterification catalyst such as sulfuric acid in combination with a polymerization inhibitor such as hydroquinone to inhibit undesirable polymerization of the unsaturated esters.

In the "ester interchange" or alcoholysis method of preparing higher aliphatic esters of $\alpha,\beta$-unsaturated monocarboxylic acids, several problems have been encountered. The yields of higher aliphatic esters have not been satisfactory due to the formation of undesirable polymers. Furthermore, emulsions are often formed which are difficult to separate and result in loss of product.

It has been suggested that the problem of excessive polymerization and emulsion formation might be solved by the introduction of oxygen-containing gases into the "ester interchange" reaction of the aliphatic alcohol or ether alcohol with the lower alkyl ester of the unsaturated monocarboxylic acid. This method has not been completely effective. Furthermore, the introduction of oxygen into the process is objectionable, since there is considerable danger of violent explosions due to the presence of free oxygen in combination with combustible materials.

In the co-pending application of Paul K. Mulvany, William W. West and Alfred Goldschmidt entitled "Preparation of Unsaturated Esters," Serial No. 612,814, filed September 28, 1956, it is shown that higher aliphatic esters of $\alpha,\beta$-unsaturated monocarboxylic acids suitable for the production of polymeric additives can be readily prepared in excellent yields without the formation of excessive polymer and/or emulsions by a process which comprises reacting a lower alkyl ester of an $\alpha,\beta$-unsaturated monocarboxylic acid with a member of the group consisting of higher aliphatic monohydric alcohols and aliphatic ether alcohols in the presence of a basic esterification catalyst and a polymerization inhibitor, the molar equivalent ratio of polymerization inhibitor to catalyst being greater than 1.

It has now been found in accordance with the present invention that substantial savings and improvement of the quality of the product in the above process may be effected by the use of a particular polymerization inhibitor, namely, quinone, without impairment of other benefits of the process such as the avoidance of excessive polymer formation and/or emulsions.

While in the previous method the polymerization inhibitor was required in a molar equivalent excess over the amount of basic esterification catalyst, the quinone polymerization inhibitor of this process is surprisingly effective in concentrations which are $\frac{1}{100}$ to $\frac{1}{25}$ of those previously used with conventional polymerization inhibitors such as hydroquinone. Since the use of quinone specifically as a polymerization inhibitor in combination with a basic esterification catalyst has apparently not been contemplated prior to the present invention, it is altogether unexpected that this inhibitor in particular would provide such a substantial saving in the amount of inhibitor required for the reaction. Since the polymerization inhibitors for such reactions as a class are a considerable part of the over-all cost, this saving in the amount of catalyst is a great economic advantage.

The use of less polymerization inhibitor such as the quinone in accordance with this invention has another important advantage in that the higher aliphatic esters of $\alpha,\beta$-unsaturated monocarboxylic acids produced in the reaction are more easily purified than products heretofore obtained in processes using large amounts of polymerization inhibitor. All of this polymerization inhibitor must be removed before the product can be used in the preparation of polymers.

Briefly stated, the improved new process of this invention for preparing polymerizable higher aliphatic esters of $\alpha,\beta$-unsaturated monocarboxylic acids comprises reacting a lower alkyl ester of an $\alpha,\beta$-unsaturated monocarboxylic acid with a member of the group consisting of higher aliphatic monohydric alcohols and aliphatic ether alcohols in the presence of a basic esterification catalyst and quinone as polymerization inhibitor.

The lower alkyl ester of $\alpha,\beta$-unsaturated monocarboxylic acid of the process preferably contains from 1 to 4 carbon atoms in the alkyl group. The more suitable esters of this type have the general formula

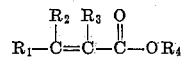

wherein $R_1$, $R_2$ and $R_3$ are the same or different members of the group consisting of hydrogen atoms and alkyl groups of from 1 to 4 carbon atoms and $R_4$ is an alkyl group of from 1 to 4 carbon atoms. Esters of this type include the methyl, ethyl, propyl, isopropyl, butyl, sec.-butyl and tert.-butyl esters of $\alpha,\beta$-unsaturated monocarboxylic acids such as acrylic, methacrylic, crotonic, tiglic, angelic, $\alpha$-ethylacrylic, $\alpha$-methylcrotonic, $\alpha$-ethylcrotonic, $\beta$-ethylcrotonic, $\alpha$-butylcrotonic, hydrosorbic, $\alpha$-ethylhydrosorbic and $\alpha$-propylhydrosorbic acids and the like as well as mixtures thereof. For present purposes, a more suitable group of esters of the foregoing type is composed of esters of acids containing a total of from about 3 to 8 carbon atoms in the molecule. The methyl and ethyl esters of acrylic and methacrylic acids, particularly methylmethacrylate, constitute preferred species on the basis of availability and effectiveness in the process of the invention.

The higher aliphatic monohydric alcohols suitably contain a higher number of carbon atoms than the number of carbon atoms in the alkyl group of the lower alkyl ester of $\alpha,\beta$-unsaturated monocarboxylic acid as described above. Preferably, the alcohol contains at least 5 carbon atoms. Still more preferred are those having from 8 to 30 carbon atoms. These alcohols are most effective in the reaction of the invention and are particularly suitable in the production of esters which are especially desirable for preparing polymeric additives of the aforementioned types.

The higher aliphatic monohydric alcohols may be of a primary, secondary or tertiary nature. For present purposes, primary and secondary alcohols, and particularly the primary alcohols, are preferred. Preferably, the alcohols are branched or straight-chain in nature, although cyclo-aliphatic groups are not precluded.

Aliphatic monohydric alcohols illustrative of the foregoing type are n-pentanol, 2-pentanol, cyclopentanol, n-hexanol, cyclohexanol, 2-ethylhexanol, dodecanol, 1-pentadecanol, octadecanol, 5-ethyldocosanol, triacontanol and the like. The straight-chain and branched-chain primary alcohols which contain from 10 to 20 carbon atoms are particularly preferred for present purposes.

The aliphatic ether alcohols are alkyl ethers of aliphatic polyhydric alcohols such as the glycols, polyalkylene glycols and other polyatomic alcohols, including glycerol, pentaerythritol, etc. Particularly suitable glycol monoalkyl ethers and polyalkylene glycol monoalkyl ethers have the formula $$HO-(-R_5-O)_n-R_6$$

wherein the $R_5$'s are 1,2-alkylene radicals of 2 to 7 carbon atoms each, $n$ is an integer of at least 1 and $R_6$ is an alkyl group of from 1 to 18 carbon atoms. The preferred ether alcohols for present purposes are the poly-1,2-alkylene glycol monoalkyl ethers of the type derived from polymerization of ethylene oxide or 1,2-propylene oxide or mixtures thereof in which aliphatic monohydric alcohols of from 1 to 18 carbon atoms are used as initiators, said ether alcohols having molecular weights between about 106 and 2,000.

Illustrative polyalkylene glycol monoalkyl ethers of the foregoing type include:

$HO-(CH_2-CH_2-O)_3-C_{12}H_{25}$
$HO-(CH_2-CH_2-O)_7-CH_3$
$HO-(CH_2-CH_2-O)_9-C_{12}H_{25}$
$HO-[CH(CH_3)CH_2-O]_3C_{13}H_{27}$
$HO-[CH(CH_3)CH_2-O]_7-C_{12}H_{25}$
$HO-[CH_2-CH_2-O-CH(CH_3)CH_2-O]_5-CH_3$
$HO-(CH_2-CH_2-O)_9CH_3$
$HO-(CH_2-CH_2-O)_{13}C_8H_{17}$
$HO-(CH_2-CH_2-O)_{13}-C_{12}H_{25}$
$HO-(CH_2-CH_2-O)_{13}-C_{18}H_{37}$
$HO[CH_2-(CH_3)CHO]_3C_{12}H_{25}$
$HO(CH_2-CH_2-CH_2O)_4C_{12}H_{25}$
$HO(C_5H_{10}O)_3C_{12}H_{25}$

Polyethylene glycol monododecyl ether mixtures having average molecular weights of 200, 400, 1000, 1540, 2000 or 10,000.

Poly-1,2-propylene glycol monododecyl ether mixtures having average molecular weights of 425, 1025 or 10,000.

The improved new process of the present invention is particularly adaptable to the use of aliphatic monohydric alcohols and for that reason those materials as described above are presently preferred.

As their name indicates, the basic esterification catalysts of the process are esterification catalysts which have the properties of a base. Such catalysts, for present purposes, are preferably alcoholates of a metal such as sodium, potassium, lithium, calcium, magnesium or aluminum. The lower alcoholates of sodium or potassium, such as sodium methylate or sodium methoxide, as it is sometimes referred to, potassium ethylate and other similar alcoholates containing not more than 7 carbon atoms, and particularly 2 or less, are still more preferred. Sodium methylate or sodium methoxide is presently the most preferred on the basis of availability and effectivity.

In the reaction, the lower alkyl ester of the $\alpha,\beta$-unsaturated monocarboxylic acid is desirably present in a molar excess over the amount of the higher aliphatic monohydric alcohol or aliphatic ether alcohol. The molar ratio of ester to aliphatic alcohol is preferably within the range of from about 3:1 to about 12:1. Molar ratios of lower alkyl ester to aliphatic monohydric alcohol of about 3:1 to about 5:1 are presently the most preferred for optimum conversions. Any excess lower alkyl ester from the reaction is conveniently recovered for reuse.

Sufficient basic esterification catalyst is employed to promote the "ester interchange" or alcoholysis of the lower alkyl ester of the $\alpha,\beta$-unsaturated monocarboxylic acid with the higher aliphatic monohydric alcohol or the aliphatic ether alcohol. From about 10 to about 50 mole percent of the catalyst on the basis of the higher aliphatic monohydric alcohol or aliphatic ether alcohol is preferably employed. About 35 mole percent of catalyst is presently the most preferred for consistently high conversions, particularly in the case of sodium methylate catalyst and aliphatic monohydric alcohols of from 10 to 20 carbon atoms.

The quinone polymerization inhibitor may be present in any desired amount sufficient to inhibit polymerization of the unsaturated compounds in the reaction according to the process of this invention. As previously mentioned, a particularly desirable feature of the present process lies in the fact that the quinone polymerization inhibitor is unexpectedly effective in small amounts. Thus, the molar equivalent ratio of the polymerization inhibitor to the basic esterification catalyst may be less than 1 for present purposes, whereas it formerly appeared that all polymerization inhibitors were required in a molar equivalent ratio greater than 1. Since the polymerization inhibitor is one of the more expensive materials in this type of process and since removal of the polymerization inhibitor is necessary in normal purification procedures prior to any polymerization, it will be appreciated that a preferred embodiment of this invention lies in the use of quinone inhibitors in a molar equivalent ratio of inhibitor to basic esterification catalyst of less than 1 and preferably of not more than 0.5. With these small amounts of quinone polymerization inhibitor, a great saving in over-all expense of the reaction is accomplished and the purification procedures are considerably simplified.

In the present description the terms "molar" and "equivalent" are used with respect to the catalyst and the quinone polymerization inhibitor in their commonly accepted sense, "molar" meaning the molecular weight of the compound expressed in grams and "equivalent" meaning the molecular weight of the compound divided by the valency of its principal radicals. For example, sodium methylate has a molecular weight of roughly 55 and the valence of its principal radical is one. Thus, a "molar equivalent" of sodium methylate is 55 grams. Quinone, on the other hand, has a valence of 4, due to its 2 double-bonded oxygens, and a molecular weight of approximately 108. Therefore, dividing 108 by 4 gives a "molar equivalent" of quinone of 27 grams which is approximately one-half the weight in this example of the sodium methylate catalyst. Accordingly, the use of any weight of quinone inhibitor less than one-half the weight of sodium methylate catalyst will give a molar equivalent ratio of inhibitor to catalyst of less than 1. Weight ratios of quinone to sodium methylate catalyst of 0.5:1 to 0.01:1 and, more particularly, 0.2:1 to 0.1:1 are very suitable for present purposes.

The reaction may be conducted at any temperature at which "ester interchange" or alcoholysis occurs. Preferably, the reaction temperature should not exceed 265° F., since undesirable polymerization may be thermally initiated at higher temperatures. Still more preferred are reaction temperatures in the range from about 190° F. to about 250° F. with temperatures of from about 210 to about 215° F. being considered the most satisfactory from the standpoint of optimum conversions and suppression of undesirable side reactions.

Atmospheric, superatmospheric or subatmospheric pressures may be employed in the reaction. Pressures less than atmospheric are generally preferred to permit proper control of the reaction temperatures within the limits described above. Pressures equal to about 300 to about 700 mm. of mercury are particularly suitable, although pressures as low as about 50 mm. of mercury may be conveniently utilized, especially in the final stages of the reaction where excess lower alkyl ester of the $\alpha,\beta$-unsaturated monocarboxylic acid may be stripped or distilled off from the crude reaction product.

Sufficient time is permitted in the reaction to insure the desired conversion of lower alkyl ester of $\alpha,\beta$-unsaturated monocarboxylic acid to the higher aliphatic ester. Usually from about 2 to about 12 hours' reaction time is sufficient. Reaction times of from about 4 to 10 hours are presently preferred for consistently high conversions.

The crude reaction product is purified by conventional procedures to give the desired higher aliphatic ester of $\alpha,\beta$-unsaturated monocarboxylic acid. Excess lower alkyl ester may be stripped off by vacuum distillation. Following this, the stripped crude product may be washed with an alkaline solution such as an aqueous solution of sodium hydroxide or sodium carbonate to extract the polymerization inhibitor. After this, the crude reaction product is washed with an aqueous salt solution of, for example, sodium chloride or sodium sulfate, to remove any base or other impurities remaining.

As mentioned previously, purification of the crude reaction product of the present invention is greatly improved due to the fact that there need be only small amounts of the quinone polymerization inhibitor present. This fact, plus the fact that the products of this process are unusually resistant to the formation of difficultly separable emulsions greatly simplifies the over-all purification procedure and gives the present process a significant advantage over processes of a similar type which have been employed heretofore.

If desired, solvents may be used in the process of the invention to facilitate the handling of reactants and maintenance of reaction conditions. Hydrocarbon solvents such as toluene or xylene are particularly suitable for reaction and/or purification steps.

In the process an azeotropic mixture is ordinarily distilled off during the reaction. This mixture contains a portion of the lower alkyl ester of $\alpha,\beta$-unsaturated monocarboxylic acid, along with the lower aliphatic alcohol by-product of the alcoholysis reaction. The lower alkyl ester of the $\alpha,\beta$-unsaturated monocarboxylic acid is conveniently recovered from the azeotropic mixture by washing with an aqueous solution, for example, brine, to separate out the more miscible lower aliphatic alcohol. The lower alkyl ester, along with remaining excess lower alkyl ester distilled off in the final stages of the process, is thus available for reuse in the process. Ordinarily, it is desirable to add polymerization inhibitor to the lower alkyl ester at this point to prevent its polymerization.

The following examples are offered in further illustration of the invention. Unless otherwise specified, the proportions are given on a weight basis.

EXAMPLE I 600 grams of methyl methacrylate (6 moles) and 10 grams of quinone (0.36 molar equivalent) are charged to a reaction vessel equipped with stirring means and reflux column. The mixture is stirred at room temperature to dissolve the quinone. 400 grams of tridecyl alcohol (2 moles) is charged to the mixture. 20 grams of solid sodium methylate (0.36 molar equivalent) is then charged. The mixture is heated under refluxing conditions, during which the reaction temperature rises steadily. When a temperature of 215° F. is reached, sufficient vacuum is applied to the reaction vessel to maintain this temperature as a maximum. The reaction is complete in 5½ hours.

The reaction mixture is distilled up to 220° F. at a pressure of about 50 mm. of mercury to strip off excess unreacted methyl methacrylate. The stripped product is cooled and transferred to a separatory vessel where it is washed with aqueous sodium hydroxide solution and with a 10% sodium chloride solution. The upper phase in the separatory vessel is recovered and dried over calcium chloride. The yield of tridecyl methacrylate is approximately 98% of theoretical, based on the tridecyl alcohol charged to the reaction. Very little emulsion, amounting to 2% or less, is formed in the process.

The details of other examples in addition to the above which are illustrative of the process of this invention are summarized in the following table. The examples follow the same general procedure as outlined in the foregoing example. These additional examples include for comparison the use of other inhibitors such as phenyl-$\alpha$-naphthylamine and hydroquinone. Also included are representative higher alpihatic monohydric alcohols and aliphatic ether alcohols.

Table

| Example No. | Moles Alcohol | Mole Ratio, Ester: Alcohol | Mole Percent Catalyst Based on Alcohol | Molar Equiv. Ratio of Inhib.: Catalyst | Reaction Time, Hrs. | Max. Temp., °F. | Yield Percent Based on Alcohol | Remarks |
|---|---|---|---|---|---|---|---|---|
| II | 2(A) | 3:1 | 20.4 | 0.20 (Q) | 5½ | 250 | 97 | Normal reaction—no emulsion problem. |
| III | 2(A) | 3:1 | 9.2 | 0.50 (PAN) | 40 | 220 | None | Polymerization. |
| IV | 1(A) | 5:1 | 22.2 | 0.34 (Q) | 5 | 225 | 94 | Normal reaction—no emulsion problem. |
| V | 2(A) | 3:1 | 16.6 | 0.22 (Q) | 5½ | 225 | 95 | Do. |
| VI | 2(A) | 3:1 | 18.5 | 0.04 (Q) | 5½ | 235 | 98 | Do. |
| VII | 2(A) | 3:1 | 9.2 | None | 1 | 195 | None | Polymerization. |
| VIII | 1.7(B) | 3.5:1 | 24.0 | 0.04 (Q) | 5 | 230 | 97 | Normal reaction—no emulsion problem. |
| IX | 1(C) | 5:1 | 31.5 | 0.12 (Q) | 6½ | 240 | 94 | Do. |

A—Tridecanol.
B—Mixed $C_{13}$-$C_{18}$ alcohols containing 1.0 mole tridecanol and 0.7 mole octadecanol.
C—Tridecanol-initiated polyethyleneglycol having an average molecular weight of approximately 440.
HQ—Hydroquinone.
Q—Quinone.
PAN—Phenyl-$\alpha$-naphthylamine.

The data provided by the above examples show that the present process for preparing higher aliphatic esters of $\alpha,\beta$-unsaturated monocarboxylic acids requires only a small fraction of the quinone polymerization inhibitor compared to similar processes utilizing hydroquinone polymerization inhibitor. Whereas in previous processes it is considered necessary to use hydroquinone polymerization inhibitor in a molar equivalent ratio of inhibitor to basic catalyst which is greater than 1, in this process, the quinone polymerization inhibitor is effective in ratios as low as 0.02. The advantages in the use of quinone as a polymerization inhibitor in accordance with this invention are obtained without the loss of any of the other advantages which are derived from the use of basic esterification catalyst and polymerization inhibitor. No emulsion problems are encountered, and the yields of product are excellent.

We claim:

1. A process for preparing higher alkyl esters of methacrylic acid which comprises reacting methyl methacrylate with a primary alkanol of from 10 to 20 carbon atoms in the presence of sodium methylate basic esterification catalyst and quinone polymerization inhibitor, the molar equivalent ratio of polymerization inhibitor to catalyst being less than one and said sodium methylate basic esterification catalyst being present in an amount of about 10 to about 50 mol percent based on the amount of primary alkanol.

2. A process for preparing higher alkyl esters of methacrylic acid which comprises reacting methyl methacrylate with tridecanol in the presence of sodium methylate basic esterification catalyst and quinone polymerization inhibitor, the molar equivalent ratio of polymerization inhibitor to catalyst being less than one and said sodium methylate basic esterification catalyst being present in an amount of about 10 to about 50 mol percent based on the amount of tridecanol.

3. A process for preparing higher alkyl esters of methacrylic acid which comprises reacting methyl methacrylate with a mixture of 1.0 mol tridecanol and 0.7 mol octadecanol in the presence of sodium methylate basic esterification catalyst and quinone polymerization inhibitor, the molar equivalent ratio of polymerization inhibitor to catalyst being less than one and said sodium methylate basic esterification catalyst being present in an amount of about 10 to about 50 mol percent based on the amount of mixed tridecanol and octadecanol.

References Cited in the file of this patent

UNITED STATES PATENTS

| | | |
|---|---|---|
| 2,129,667 | Barrett et al. | Sept. 13, 1938 |
| 2,129,694 | Izard | Sept. 13, 1938 |
| 2,129,722 | Woodhouse | Sept. 13, 1938 |
| 2,396,434 | Rehberg et al. | Mar. 12, 1946 |

OTHER REFERENCES

Kice: J. Am. Chem. Soc., 76 (1954), 6275–6.
Frank et al.: J. Am. Chem. Soc., 68 (1946), 908.
Riddle: "Monomeric Acrylic Esters" (1954), pp. 186–8.